United States Patent [19]

Altman

[11] 4,418,592
[45] Dec. 6, 1983

[54] STOPPING FIXTURE

[76] Inventor: Vladimir Altman, 2985 Ocean Pkwy., #3-D, Brooklyn, N.Y. 11235

[21] Appl. No.: 159,061

[22] Filed: Apr. 6, 1981

[51] Int. Cl.³ .............................................. B23B 3/36
[52] U.S. Cl. ................................. 82/34 C; 269/48.1; 279/1 S
[58] Field of Search ................. 82/34 C, 44; 279/1 S, 279/2 R; 269/48.1, 52, 234; 242/72.1, 72 R; 83/180

[56] References Cited

U.S. PATENT DOCUMENTS

| | | | |
|---|---|---|---|
| 2,396,504 | 3/1946 | Grey | 279/1 S |
| 2,398,278 | 4/1946 | Bailey | 82/34 C X |
| 2,756,059 | 7/1956 | Knapp | 279/1 S |
| 2,767,677 | 10/1956 | Johnson et al. | 269/48.1 |
| 3,031,995 | 5/1962 | Taylor, Jr. | 269/48.1 |
| 3,194,467 | 7/1965 | Goonan et al. | 269/48.1 X |
| 3,385,607 | 5/1968 | Hughes | 279/1 S |
| 3,990,690 | 11/1976 | Lick | 269/48.1 |

FOREIGN PATENT DOCUMENTS 2525103  12/1976  Fed. Rep. of Germany ...... 279/1 S

*Primary Examiner*—Frank T. Yost
*Attorney, Agent, or Firm*—Ilya Zborovsky

[57] ABSTRACT

A stopping fixture for a hollow spindle of a headstock has two elements movable relative to one another in an axial direction of the spindle and insertable into the latter, whereas the elements have inclined surfaces so that when one of the elements is axially displaced relative to the other element, at least one element moves radially outwardly relative to the other element and thereby the elements are firmly clamped against the inner wall of the spindle.

11 Claims, 3 Drawing Figures

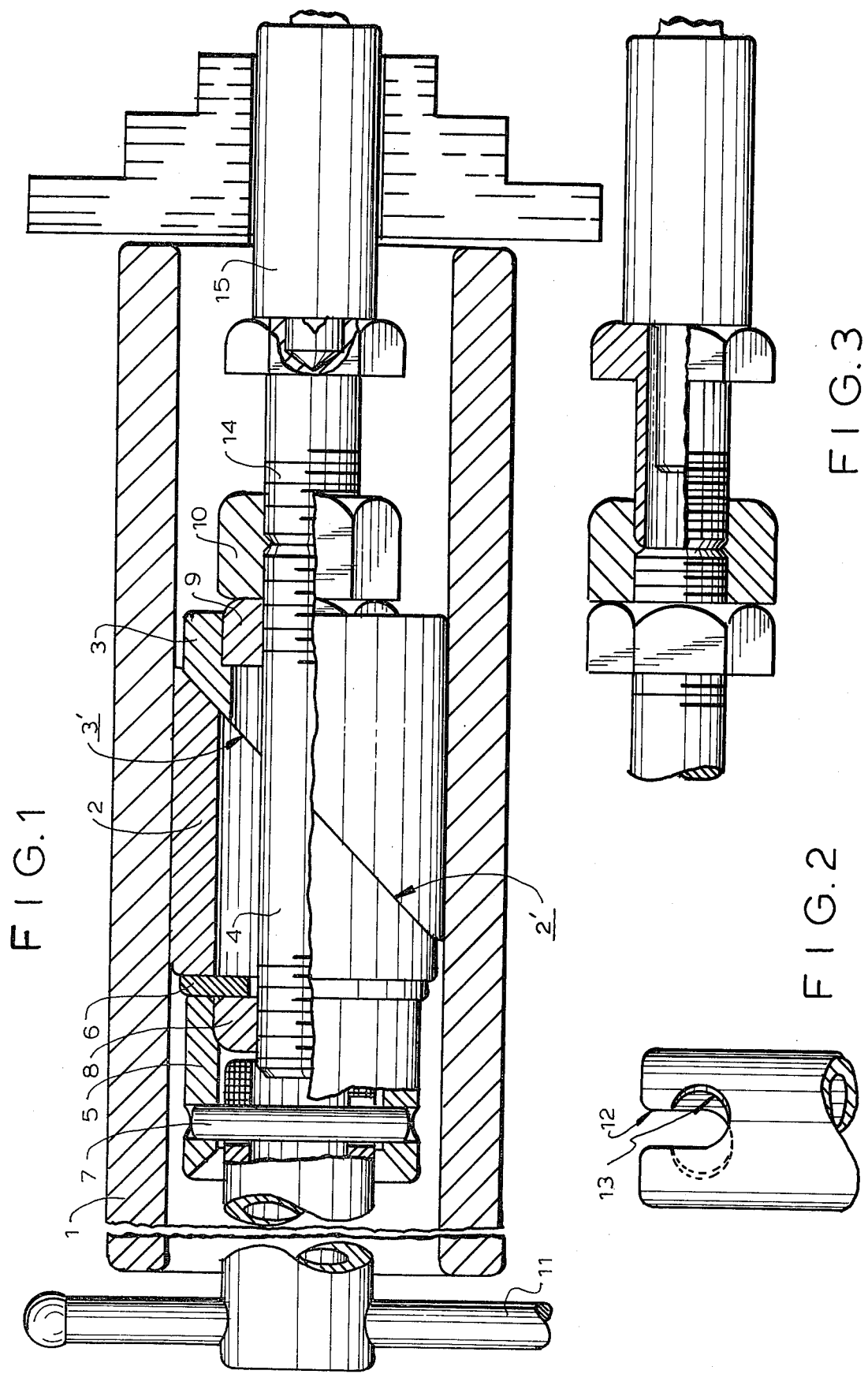

STOPPING FIXTURE

BACKGROUND OF THE INVENTION

The present invention relates to a stopping fixture for a hollow spindle of a headstock.

Stopping fixtures for hollow spindles of a headstock of a lathe or other machine tools are known in the art. A known stopping fixture is generally utilized in a set including a plurality of stepped stopping fixtures of different dimensions. The known stopping fixture possesses several disadvantages. It is difficult to utilize the fixture at any distance from the chuck. Chips inside the spindle disturb setting of the fixture and cleaning of the same is necessary. The setting of the fixture is troublesome and time-consuming. It is not always expedient to set up the fixture for a few workpieces. It is substantially difficult to select the length of the protruding part of the fixture. The fixture is not inexpensive to manufacture. The known fixtures are not always compact and do not always provide for required setting strength.

SUMMARY OF THE INVENTION

Accordingly, it is an object of the present invention to provide a stopping fixture which avoids the disadvantage of the prior art.

More particularly, it is an object of the present invention to provide a stopping fixture which does not have limitation as to the length of the protruding part, does not require thorough cleaning of the hollow spindle, can be utilized both for mass production and only for a few workpieces, is inexpensive to manufacture and can be firmly fixed inside the hollow spindle.

In keeping with these objects and with others which will become apparent hereinafter, one feature of the present invention resides, briefly stated, in a stopping fixture which includes two elements having inclined surfaces which cooperate with one another, so that when one of the elements is axially displaced toward the other of the elements, the elements move radially outwardly and are firmly clamped against the inner wall of the hollow spindle.

The novel features which are considered as characteristic will be set forth in the appended claims in particular.

The invention itself will be best understood from the following description of the same, accompanying the following drawings, whose description is presented hereinbelow.

BRIEF DESCRIPTION OF THE DRAWING

FIG. 1 is a view showing a section of a stopping fixture located in a hollow spindle, in accordance with the present invention;

FIG. 2 is a view showing a portion of a tool which is utilized for actuating of the inventive stopping fixture so as to provide for clamping the same in the hollow spindle or releasing the same and FIG. 3 is a view showing the stopping fixture with a different adapter element.

DESCRIPTION OF A PREFERRED EMBODIMENT

A stopping fixture in accordance with the present invention is shown as located in a hollow spindle 1 of a headstock.

The stopping fixture has a first element identified by reference numeral 2 and a second element identified by reference numeral 3. Both elements are tubular and have inner passages. Each of the elements 2 and 3 has an inclined surface identified by reference numerals 2' and 3', respectively.

A threaded member 4 extends through the inner passages of the elements 2 and 3. It can be threaded only at axial end portions or over the entire length thereof. A tubular member 5 abuts against the element 2 with interposition of a washer 6. A pin 7 extends transversely of and is fixedly mounted in the tubular member 5.

The right portion of the tubular member 5 is provided with an inner thread which can be formed for example, by a nut 8 having an inner thread and fixedly mounted in the tubular member 5 for joint axial displacement but without relative rotation to the latter.

The right end portion of the element 3 is also threaded which can be carried out, for example, by a nut 9 having an inner thread and fixedly mounted in the element 3 for joint axial displacement and without rotation relative to the element 3. A counter nut 10 is further provided and screwed on the outermost end portion of the threaded member 4 formed as a stud. The nut 8 is screwed on the left end portion of the threaded member 4.

At the left side of FIG. 1 a tool is shown for actuating the inventive stopping fixture. The tool may be formed as a groove wrench 11 having a slot 12 merging into an opening 13. The opening 13 is somewhat laterally displaced relative to the axis of the slot 12.

Finally, an adapter of transition piece 14 is shown at the right side of the drawing. A workpiece 15 is to abut against the member 14 or to be fixed in the same. FIG. 3 shows a different adapter for fixing a workpiece with trunnions.

The stopping fixture in accordance with the present invention operates in the following manner:

The stopping fixture is inserted into the interior of the hollow spindle 1 in condition when the elements 2 and 3 are not radially spread apart from one another, or in other words when the outer diameter of both element 2 and 3 measured in the transverse direction is smaller than the inner diameter of the hollow spindle 1. The stopping fixture is set in any location in direction of the axis of the hollow spindle. Then, the groove wrench is inserted into the left side of the hollow spindle and engages with the pin 7 of the tubular member 5. The offset of the opening 13 relative to the slot 12 of the tool facilitates this process and also provides for more reliable engagement.

By turning the groove wrench 11, the tubular member turns via the pin 7, and the nut 8 of the tubular member 5 is screwed onto the threaded member 4. The threaded member 4 is pulled since threaded member is screwed into the nut 8, in turn. The threaded member 4 during its pulling to the left, pulls the element 3 to the left toward the element 2. The surfaces 2' and 3' slide over one another, and the element 2 displaces radially relative to the element 3. Thus, the elements 2 and 3 become firmly clamped against the inner wall of the hollow spindle 1 in the predetermined position.

The inventive fixture is easy to manufacture, guarantees firm clamping in the hollow spindle, may be located in any axial position, does not depend on the degree of cleanness of the inner wall of the hollow spindle, is compact and the like. The extraction of the inventive stopping fixture is performed in the reverse order.

The offset of the openings 13 relative to the slots 12 allows, during extraction of the stopping fixture, not only to turn free pin 7 but also to pull it to the left side so as to pull the whole stopping fixture.

While the invention has been illustrated and described above, it is not limited to the details shown inasmuch as various modifications and structural changes can be made without departing in any way from the spirit of the present invention.

What is claimed as desired to be protected by Letters Patent is set forth in the appended claims.

1. A stopping fixture for a hollow headstock spindle having an axis, comprising
   a first element arranged to be inserted into a hollow of a headstock spindle and to move in an axial direction of the latter, said first element having a first surface which is inclined relative to an axis of the headstock spindle;
   a second element also arranged to be inserted into the hollow of the headstock spindle and to move in the axial direction of the latter, said second element having a second surface inclined relative to the axis of the headstock spindle and cooperating with said first inclined surface of said first element so that when one of said elements is moved axially relative to the other of said elements, said elements move radially apart from one another and are pressed against an inner wall of the headstock spindle to be fixed in the latter at a predetermined location; and
   means for moving said one element relative to said other element so as to provide for cooperation of said inclined surfaces of said elements, said moving means including a threaded member connected with said other element so that when said threaded member is moved axially it moves axially said other element relative to said one element, said elements being tubular and having outer cylindrical surfaces of substantially equal diameters and inner cylindrical surfaces of diameters considerably exceeding the diameter of said threaded member.

2. A stopping fixture as defined in claim 1, wherein said means for moving said one element relative to said other element includes an actuating member arranged to be screwed onto said threaded member so as to pull said threaded member.

3. A stopping fixture as defined in claim 2, wherein said threaded member has a first axial end portion extending through said other element and a second axial end portion axially spaced from said first axial end portion and arranged to be screwed into said actuating member, said actuating member being formed by a tubular member with a nut fixedly mounted therein and arranged to be screwed onto said axial end portion.

4. A stopping fixture as defined in claim 3, wherein said first axial portion of said threaded member has an axially external section; and further comprising an adapter element exchangeably attachable to said external section.

5. A stopping fixture as defined in claim 3; and further comprising a tool arranged to screw said actuating member onto said second axial end portion of said threaded member.

6. A stopping fixture as defined in claim 5, wherein said actuating member is a tube provided with a pin extending transversely to the latter, said tool member being a groove wrench operative for engaging and turning said pin and thereby said actuating member.

7. A stopping fixture as defined in claim 3; and further comprising a counter nut which is screwed onto said first axial end portion of said threaded member to prevent rotation of said other element relative to said threaded member.

8. A stopping fixture as defined in claim 7; and further comprising an adapter element attachable to said threaded member by screwing into said counter nut, to form an abutment for a workpiece.

9. A stopping fixture as defined in claim 7, wherein said nut is hexahedral and pressed into said other element only by apices of its hexahedron.

10. A stopping fixture as defined in claim 3, wherein said nut is hexahedral and pressed into said tubular member only by apices of its hexahedron.

11. A stopping fixture as defined in claim 1, wherein said inclinee surfaces are inclined relative to the axis of the headstock spindle at an angle equal to substantially 45°.

* * * * *